United States Patent [19]
Ittner et al.

[11] Patent Number: 6,044,643
[45] Date of Patent: Apr. 4, 2000

[54] ENGINE CONTROL SYSTEM AND METHOD

[75] Inventors: Heinrich Ittner, Novi; Malcolm James Grieve, Highland; Gary Charles Abusamra, Grand Blanc, all of Mich.

[73] Assignee: General Motors Corporation, Detroit, Mich.

[21] Appl. No.: 08/990,410

[22] Filed: Dec. 15, 1997

[51] Int. Cl.$^7$ ..................................................... F01N 3/00
[52] U.S. Cl. .............................. 60/289; 60/274; 60/285; 60/293; 123/699
[58] Field of Search .............................. 60/285, 289, 290, 60/307, 274, 293, 299, 278; 123/699, 704, 585, 586, 587, 588

[56] References Cited

U.S. PATENT DOCUMENTS

| | | |
|---|---|---|
| 5,293,553 | 3/1994 | Dudek et al. . |
| 5,333,446 | 8/1994 | Itoh .......................................... 60/274 |
| 5,461,857 | 10/1995 | Itou et al. .................................. 60/276 |
| 5,519,992 | 5/1996 | Hosoya et al. ............................. 60/276 |
| 5,675,968 | 10/1997 | Katashiba et al. ......................... 60/276 |
| 5,809,773 | 9/1998 | Gottberg ................................... 60/274 |

FOREIGN PATENT DOCUMENTS

553516 A2  12/1994  European Pat. Off. .

OTHER PUBLICATIONS

Developments & Advances in Emission Control Technology: #SP–1120; Fast Light Off of Underbody Catalysts #952417; Society of Automotive Engineers, 1995.

*Primary Examiner*—Thomas Denion
*Assistant Examiner*—Binh Tran
*Attorney, Agent, or Firm*—Vincent A. Cichosz

[57] ABSTRACT

An engine control system comprising: a mass air flow sensor in an air intake path for a vehicle engine and providing a first input signal indicative of mass air flow through the mass air flow sensor; an air pump unit having an inlet coupled between the mass air flow sensor and the vehicle engine and an outlet coupled in a path of exhaust from the vehicle engine, wherein the air pump unit is responsive to a first control command; a mass air flow estimator responsive to a set of measured engine parameters for providing a second input signal indicative of mass air flow into the intake manifold; and a control unit including a first control command generator responsive to the first and second input signals to provide the first control command responsive to a difference between the first and second input signals, wherein the difference between the first and second input signals represents an estimate of the instantaneous secondary air flow. If the system is mechanized to allow modulation of the secondary air system with a duty cycle, this further enables closed-loop control of secondary air provided by the air pump. The system effectively estimates instantaneous secondary air flow, enabling control of fuel and air to the engine in response to the estimated secondary air flow to provide tight control of exhaust chemistry and a strong exotherm to heat the catalytic converter. The system enables robust performance of the emission control system over an extended time as changes in pump airflow are directly estimated and appropriate control actions may be taken to give optimal system performance.

13 Claims, 5 Drawing Sheets

ENGINE CONTROL SYSTEM AND METHOD

BACKGROUND OF THE INVENTION

Many vehicle engine control systems regulate fueling to the engine in response to measured or estimated air flow into the engine so that the air and fuel mixture into the engine provide a stoichiometric mixture. It is typical for a vehicle to include an exhaust oxygen sensor in the exhaust flow path to sense whether a fuel-rich condition (i.e., excess hydrocarbons and carbon monoxide) or a fuel-lean condition (i.e., excess oxygen) exists in the exhaust. The engine controller responds to the oxygen sensor by adjusting the air fuel ratio entering the engine to minimize the rich or lean excursions of the exhaust gas, ideally maintaining the average exhaust gas composition at stoichiometry.

It is known practice to run the engine in a fuel rich condition at start up to (a) aid in the operation of the cold engine and (b) provide fuel for reaction in the exhaust path downstream of the engine to quickly heat up the vehicle's catalytic converter. For example, an air pump is placed to pump atmospheric air in the exhaust path downstream of the engine to react with fuel in the fuel rich exhaust during the time period immediately following vehicle start up. The reaction of the fuel rich exhaust and the pumped-in air, referred to as secondary or supplemental air, is exothermic and serves to heat up the catalytic converter. Various approaches have been taken for providing the secondary air, including injecting the secondary air directly into the exhaust ports of the engine so that the hot exhaust exiting the combustion chambers ignites with the injected air, or injecting the air closer to the catalytic converter and using a supplemental heat source such as an electric heater to ignite the air and fuel rich exhaust. Even further alternatives include injecting air between two catalyst-coated substrates in a catalytic converter, i.e., where the upstream catalyst-coated substrate includes a reduction catalyst and the downstream catalyst-coated substrate includes an oxidizing catalyst. Because of the nature of air pumps and their control, open loop flow control of secondary air is often not precise, limiting the capable accuracy of the air fuel ratio control in the exhaust system downstream of the engine.

Mass air flow sensors may be placed within the pump's air path to provide a direct measurement of secondary air flow. However, such mass air flow sensors are an expensive addition to the vehicle.

SUMMARY OF THE INVENTION

It is an object of this invention to provide an engine control system according to claim 1.

Advantageously, this invention provides an engine control system for use with a vehicle including an air pump for providing secondary air injection into the path of exhaust flowing downstream of the vehicle engine.

Advantageously, this invention provides the engine control system with a pump for secondary air with improved control of the equivalence ratio of the exhaust gasses entering the catalytic converter. Advantageously, this improved control of catalyst equivalence ratio is provided by controlling the fuel and air flow into the engine and/or the flow of secondary air flow into the exhaust. Advantageously, this improved control of catalyst equivalence ratio is achieved without requiring a separate sensor to directly measure secondary air flow through the air pump unit.

Advantageously, this invention achieves an instantaneous estimate of the secondary air flow without requiring sensors other than those already present on many motor vehicles.

More particularly, this invention makes use of intake air flow modeling technology to provide an indication of instantaneous mass air flow through the secondary air flow pump. This is achieved by comparison of the estimated flow into the intake manifold (based on geometry, temperature and pressure conditions) to the air flow measured by the mass air flow sensor. In this case, the engine may be fueled based on the intake port flow estimate plus the instantaneous secondary air mass flow (as estimated). In steady state conditions, this is equivalent to fueling directly from the mass air flow sensor measurement. Thus a simpler alternative of fueling based on the mass air flow sensor is available if transient effects are not of critical importance.

According to a preferred example, this invention provides an engine control system comprising: a mass air flow sensor in an intake path for a vehicle engine providing a first input signal indicative of mass air flow through the mass air flow sensor; an air pump unit having an inlet coupled between the mass air flow sensor and the vehicle engine and an outlet coupled into a path of exhaust from the vehicle engine, wherein the air pump unit is responsive to a first control command; an engine intake mass air flow estimator providing a second input signal indicative of mass air flow into the intake manifold; and a control unit including a first control command generator responsive to the first and second input signals to provide the first control command responsive to a difference between the first and second input signals wherein the difference between the first and second input signals enables closed-loop control of the air pump.

According to another preferred example, the engine control system also includes: an actuator for regulating fuel delivery to the engine responsive to a second control command; a port intake mass air flow estimator providing a third input signal indicative of mass air flow through the intake port into the engine wherein the control unit includes a second control command generator to provide the second control command responsive to a sum of (a) the difference between the first and second input signals and (b) the third input signal.

BRIEF DESCRIPTION OF THE DRAWINGS

The present invention will now be described by way of example with reference to the following drawings, in which.

DETAILED DESCRIPTION OF THE INVENTION

Figure 1:
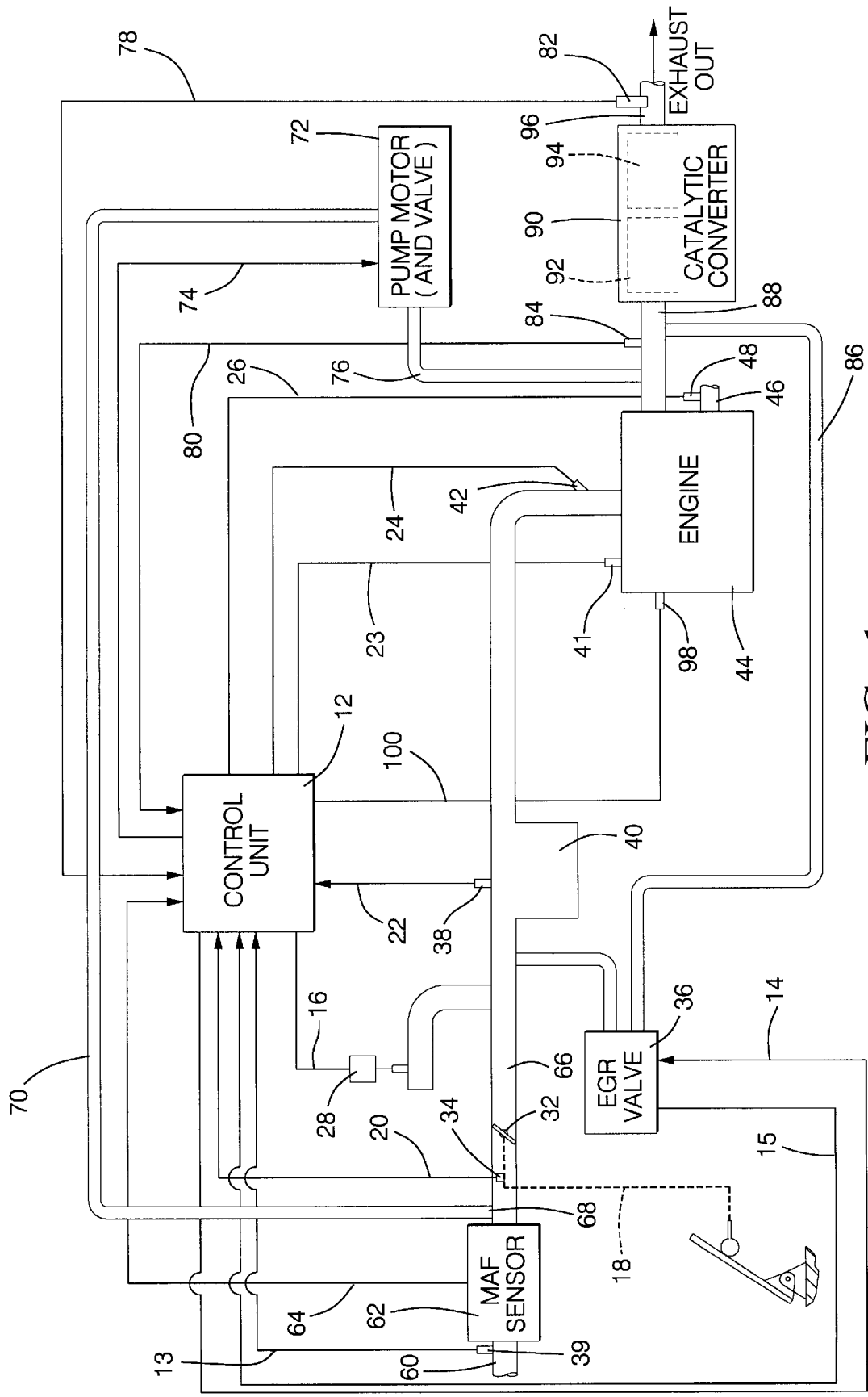
FIG. 1 illustrates an example control system according to this invention.

Referring now to FIG. 1, the engine assembly shown includes engine 44, fuel injector(s) 42, spark plugs 41, air intake manifold 40, throttle valve 32, exhaust gas recirculation (EGR) valve 36 (optional) and idle air control (IAC) valve 28 (optional). The assembly also includes mass air flow 25 sensor 62, secondary air pump motor (and control valve) unit 72, engine coolant temperature sensor 98, oxygen sensors 82 and 84 and catalytic converter 90. Throttle valve 32 is controlled by accelerator pedal 30, either directly with a cable or indirectly in a "drive-by-wire" configuration, as shown by dotted line 18. The air temperature is measured upstream of the throttle valve 34 and atmospheric pressure is sensed by the intake manifold pressure sensor 38 during conditions when the engine is not running, may be estimated during driving conditions, or may be measured by a separate barometric pressure sensor (not shown). IAC valve 28, EGR valve 36, spark plugs 41, fuel injectors 42 and secondary air pump motor unit 72 are controlled by controller 12 through lines 16, 14, 23, 24 and 74.

The states of the engine assembly including engine speed, throttle position, EGR valve position, IAC valve position, intake air temperature, atmospheric pressure, intake manifold pressure, coolant temperature and exhaust oxygen sensor signals (upstream and downstream of the converter) comprise a set of engine parameters that are measured or estimated by the controller. Temperature sensor 39 measures intake air temperature and provides a signal indicative of the measured temperature to the controller 12 through signal line 13. The position of the IAC valve 28 may be measured or determined by integration of the command on line 16. The position of the EGR valve 36 is provided to the controller on line 15. The throttle position and manifold pressure are sensed by sensors 34 and 38 and input into the control unit 12 through lines 20 and 22. Engine speed is measured through sensor 48, which detects rotations of the engine crank shaft 46, and is input into the control unit 12 through line 26. Engine coolant temperature is measured by sensor 98, mounted to the engine 44 in a known manner. Oxygen sensors 84 and 82 provide typical signals of exhaust air fuel ratio upstream and downstream of the catalytic converter 90 and provide those signals through lines 80 and 78 to the controller 12. The sensors mentioned above are all standard sensors, a variety of which are readily available to those skilled in the art.

The control unit 12 is of a known type except for the improvements referred to herein. An example control unit 12 typically includes a microprocessor, an internal clock unit, an input/output interface unit, appropriate interfaces for controlling engine spark timing, fuel injection, IAC valve position, EGR valve position and for providing a pulse width modulated command to the secondary air pump motor unit 72. The secondary air pump motor unit 72 may have a motor that responds directly to the command on line 74 or may be of a type in which the motor is run at a constant power level and air flow through the pump is controlled by pulse width modulating a solenoid valve of a known type. Such pump and valve units are well known to those skilled in the art and details thereof need not be disclosed herein. Both example secondary air pump motor units 72 and any other type of controllable pump motor unit are considered equivalents for purposes of this invention.

Within the control unit 12, the internal microprocessor executes an engine control program implementing this invention with standard engine control functions. The control program is stored in a ROM or other permanent memory device and RAM is used for temporary storage of program variables, parameter measurements and other data. Standard interface units are provided for translating the sensor signals into signals usable by control unit 12.

It will be understood by those skilled in the art that many engines do not have all of the features shown on the example engine assembly. For example, many engines do not have an EGR valve 36 or an IAC valve 28, but their presence is not necessary for successful implementation of this invention and modification of the examples disclosed herein to operate in such engines will be well within the abilities of one skilled in the art in view of this disclosure.

In implementing the present invention, the control unit 12 reads the various engine states provided by the sensors illustrated in FIG. 1. Using the sensor information, the control unit includes two estimators to perform two model-based estimations. The first model based estimation is of instantaneous throttle mass air flow into the intake manifold based on pressures, system geometry, throttle angle and IAC valve position with corrections responsive to upstream temperature and pressure. A description of an example estimator for estimating mass air flow into the intake manifold is provided in pending U.S. patent application, Ser. No. 08/759,276, filed Dec. 2, 1996, assigned to the assignee of this invention, the disclosure of which is incorporated herein by reference. Because the details of the first model-based estimation are fully disclosed in the pending application Ser. No. 08/759,276 and are not germane to this invention, those details will not be repeated herein except on a general level.

The second model-based estimation estimates mass air flow at the intake port into the engine, i.e., in the area proximate to fuel injector 42. An example estimator for determining mass air flow at the intake port is set forth in pending U.S. patent application, Ser. No. 08/759,277, filed Dec. 2, 1996, assigned to the assignee of this invention, the disclosure of which is incorporated herein by reference. Because the details of the second model-based estimator are fully set forth in the pending application Ser. No. 08/759,277 and are not germane to this invention, those details will not be repeated herein.

The output of the first estimator is used along with the signal from the mass air flow sensor to instantaneously estimate secondary air flow. This instantaneous estimate may be used to provide closed loop control of the secondary air pump motor unit 72 if the system is appropriately mechanized. More particularly, the secondary air pump motor unit 72 has its intake 70 provided at a point 68 in the engine air intake flow path located between the mass air flow sensor 62 and the throttle valve 32, or in an engine without a throttle valve, between the mass air flow sensor 62 and intake manifold 40. The outlet 76 of secondary air pump motor unit 72 preferably injects the secondary air at the various exhaust ports of the vehicle engine so that the secondary air provided by the secondary air pump motor unit 72 directly mixes with the hot exhaust gas as the exhaust gas exits the engine combustion chambers. This allows for oxidation of unburned and incompletely burned fuel in the hot exhaust gasses with the additional air provided by the secondary air pump motor unit 72. If such direct ignition is not desired, the outlet 76 can be located further downstream in the exhaust path or even between catalyst substrates 92 and 94 within catalytic converter 90. In these cases an optional device (or devices) to initiate or assist in the initiation of ignition in the exhaust may be used (for example a spark plug or a glow plug).

The mass air flow sensor 62 provides the signal on line 64 equal to the sum of the mass air flow into the intake manifold 40 and the mass air flow through the secondary air pump motor unit 72. The first estimator estimates only mass air flow into the intake manifold 40. The controller determines the mass air flow through the secondary air pump motor unit 72 as the difference between the mass air flow measured by the sensor 62 and that estimated by the first model. The output of the second model and the estimated secondary air flow are used to calculate the desired fuel input which is delivered to the fuel injectors 42 with the command line 24. By introducing suitable time delay, the engine out exhaust mass flow and equivalence ratio may be estimated. The exhaust mass flow and exhaust equivalence ratio combined with the secondary air mass flow allow instantaneous estimation of the catalyst equivalence ratio and the catalyst mass flow rate, which is the rate of exhaust mass flow into the catalytic converter. The catalyst equivalence ratio and the catalyst mass flow rate are used to vary the fuel flow rate to the engine with fuel injectors 42 and, in a system with duty cycle modulation of the secondary air, to generate an open loop secondary air command for the secondary air pump motor unit 72.

The controller may also determine a desired modification to the mass air flow into the engine based on the determined mass air flow through the secondary air pump motor unit 72, the estimated port mass air flow and the exhaust and catalyst equivalence ratios. A control command is then generated for the IAC valve 28, controlling the valve 28 to achieve the desired change in mass air flow into the engine. In vehicles where the throttle valve 32 is controlled electronically, the control command for achieving the desired modification to mass air flow into the engine may be sent to the throttle valve 32.

Figure 2:
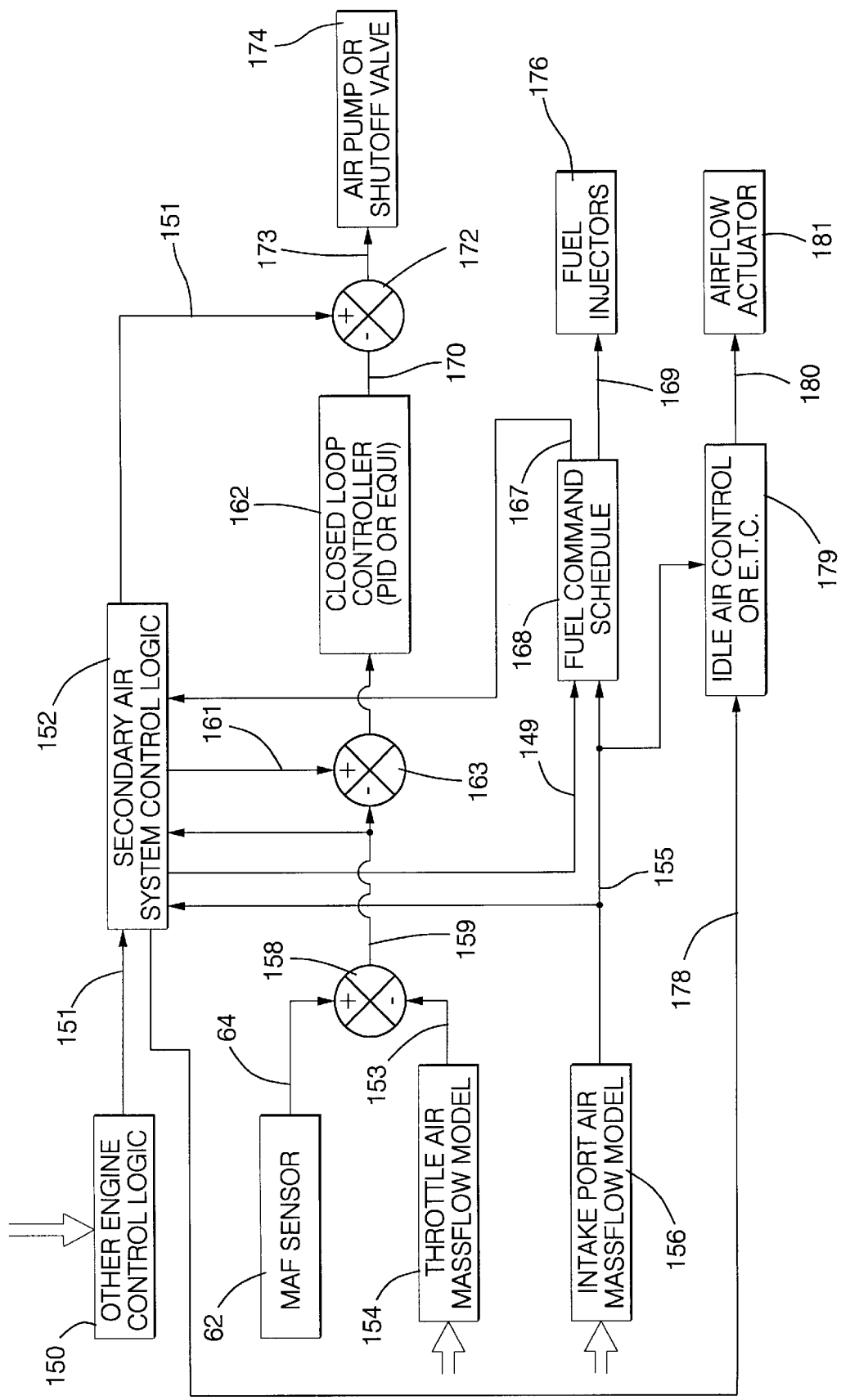
FIG. 2 illustrates a schematic of an example control according to this invention.
Figure 3:
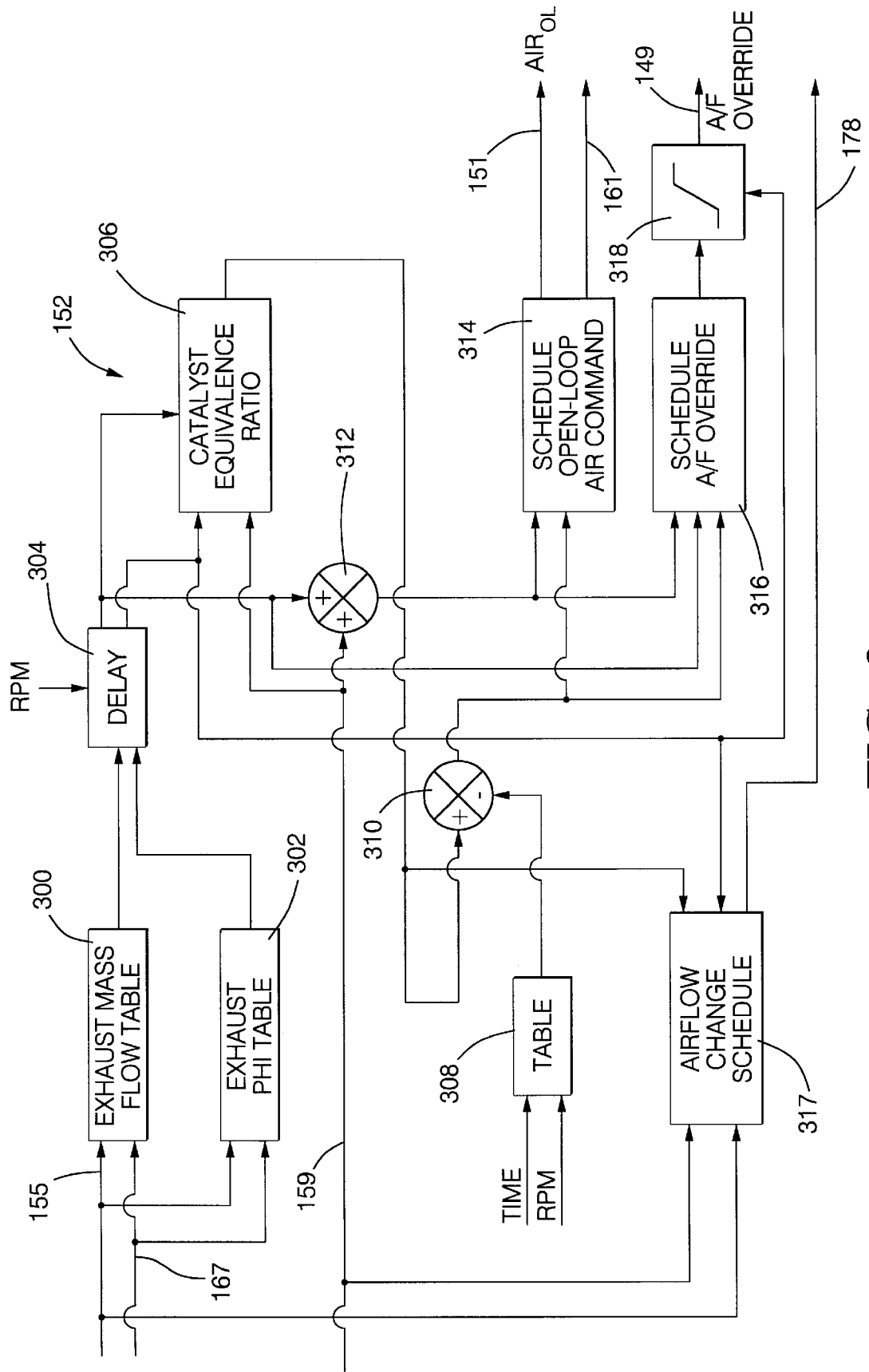
FIG. 3 illustrates a schematic of an example control of block 152 of FIG. 2.

Referring now to FIGS. 2 and 3, an example control according to this invention can be better understood. The mass air flow sensor 62 provides a signal on line 64 indicative of total mass air flow through intake duct 60 (FIG. 1), which is the sum of mass air flow into the engine 44 and secondary air pump motor unit 72. The engine air flow model-based estimator 154 is the model referred to above with reference to copending patent application, Ser. No. 08/759,276, and provides a signal on line 153 comprising an estimate of the total mass air flow through the throttle valve 32 and into the engine 44.

Block 158 subtracts the signal on line 153 from the signal on line 64 and provides a difference signal on line 159. The difference signal on line 159 indicates actual mass air flow through the secondary air pump motor unit 72. The signal on line 159 is provided to block 163, which subtracts the signal on line 159 from the desired supplemental air mass flow command on line 161 to determine an error signal to be provided to the closed loop command control 162, implementing a standard PID (or equivalent alternative) control function known to those skilled in the art. Block 162 provides on line 170 a closed loop command in the form of a duty cycle command signal. Block 172 sums the output of block 170 with the open loop duty cycle command signal on line 151 to provide the resultant duty cycle control command on line 173 to the pump motor or valve (whichever is implemented as the secondary air control actuator) represented by block 174. The resultant duty cycle control command achieves a pulse width modulation control of the pump motor or valve regulating the rate that secondary air is injected into the exhaust path.

Block 156 represents the intake port air flow model-based estimator referred to above with reference to pending patent application, Ser. No. 08/759,277, and provides the signal on line 155 indicative of mass air flow at the intake port to the engine 44. Blocks 168 and 152 receive the signal on line 155. Block 168 represents a fuel command function of a type known to those skilled in the art responsive to mass air flow and oxygen sensor output signals to provide known open and closed loop fuel control commands. Block 168 also receives the signal on line 149, determined by command generator 152 during open loop fuel control operation of the engine and indicative of a desired air fuel ratio override command determined as described further below. Block 168 schedules the fuel command from the port mass airflow estimation on line 155 and determines the following:

fuel override=$MAF_P/AF_O$, where $MAF_P$ and $AF_O$ are the signals on lines 155 and 149, respectively. Block 168 selects the richer of the scheduled fuel command and the fuel override command during open loop fuel control. The output of block 168 is the desired mass of fuel command on line 167, which block 168 also converts to an injection duty cycle command on line 169 using wall wetting compensation in a manner known to those skilled in the art. The duty cycle command on line 169 is provided to actuator 176, which generically represents any fuel actuator such as a throttle fuel injector or a port fuel injector or other type of controllable fuel delivery system operated in a known type of pulse width modulation control.

Block 179 responds to the estimated port mass air flow signal on line 155 and the signal on line 178 indicating a desired port mass airflow change command, and determines an actuator command on line 180 using a standard PID or other closed loop control to regulate IAC valve actuator 181 (or a throttle valve actuator if electronic throttle control is used).

The signals on lines 155, 159 and 167 are provided to the command generator 152, which determines the desired supplemental mass air flow command, the open loop secondary air command, the air fuel ratio override command and the desired port mass air flow change command on lines 161, 151, 149 and 178, respectively. A standard engine control function block 150 determines whether the engine is in closed or open loop fuel control operation and provides an enabling signal to block 152 only when the engine is an open loop operation.

Referring now to FIG. 3, the function of secondary air system logic block 152 is shown. The intake port mass air flow signal on line 155 and the fuel signal on line 167 are provided to function blocks 300 and 302, which may be implemented as three dimensional look-up tables to provide exhaust mass flow and exhaust equivalence ratios, respectively. The functions of blocks 300 and 302 may be determined from a known formula for calculating exhaust mass flow and equivalence ratio (phi) from port mass flow estimations and fuel delivery commands, with corrections for transient fuel phenomena, which are well known to those skilled in the art.

Alternatively, the look-up tables 300 and 302 may be determined in a test vehicle by varying the mass air flow and fuel commands to the engine, then measuring the exhaust mass flow and the exhaust equivalence ratio at the output and programming the measured variables into the look-up table at positions corresponding to the port mass air flow measurements or estimations and fuel delivery commands at which such exhaust mass flow and exhaust equivalence ratio measurements are taken.

The output of the look-up tables 300 and 302 are provided to delay block 304, which is responsive to the measured engine speed to account for the engine cycle delay that takes place as the intake mass air flow and fuel are being delivered to the engine combustion chamber, combust and exit through the cylinder exhaust port. The delayed signals are then provided to block 306, which also uses the signal on line 159 indicative of actual secondary air flow to determine the equivalence ratio, $\phi_{CAT}$, of the mix of exhaust gases and secondary air entering the catalytic converter. More particularly, block 306 implements the following function to determine $\phi_{CAT}$:

$$\phi_{CAT}=\phi_{EX}* MAF_{EX}/(MAF_{EX}+MAF_S),$$

where $\phi_{EX}$ is the equivalence ratio of the exhaust gasses, $MAF_{EX}$ is the exhaust mass flow rate and $MAF_S$ is the actual secondary air mass flow rate (i.e., line 159, FIG. 2) with appropriate delays applied. The signal $\phi_{CAT}$ output from block 306 is provided to block 310 where it is compared with a desired catalyst equivalence ratio, $\phi_{CATD}$, which may be a fixed value or preferably is determined as a function of time expired since the engine has been started and engine speed by a look-up table 308. The look-up table 308 may be determined by running a series of tests after engine start up, varying the engine speed and adjusting the equivalence ratio in the exhaust entering the catalytic converter catalyst to the point where the catalyst provides optimum performance and then programming the optimum equivalence ratio function into the table 308, where the optimum equivalence ratio is scheduled based on parameters including engine speed and run time. Other parameters that may be included to increase performance are engine load and an integration of excess fuel and secondary air delivered to the exhaust system.

Figure 4:
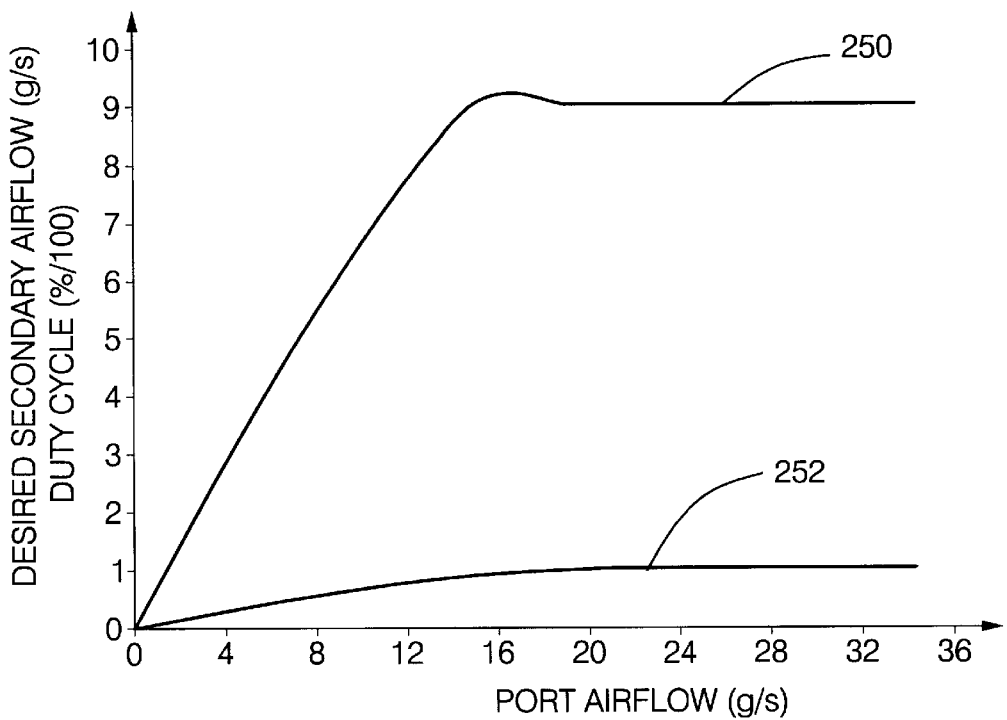
FIG. 4 illustrates an example function of block 314 of FIG. 3.

The output of block 310 is the catalyst equivalence ratio error and is provided to block 314 along with the output of block 312, which is the sum of the secondary air mass air flow on line 159 and the exhaust mass air flow that has been delayed by block 304. Block 314 uses the signals from blocks 310 and 312 to determine the desired supplemental mass air flow signal on line 161 and the open loop duty cycle command on line 151. The function at block 314 may be implemented by a look-up table, equation or equivalent, for example, to achieve the following transfer function:

$$MAF_S = MAF_P * (\phi_{EX} - 1)/\phi_{CATD},$$

where $MAF_S$ is the desired supplemental mass air flow signal on line 161 and $MAF_P$ is the estimated port mass air flow signal on line 155. The open loop duty cycle command on line 151 is determined from the signal on line 161 (and preferably the estimated barometric and exhaust pressures). FIG. 4 illustrates an example relationship between the estimated port mass air flow on line 155 and the desired supplemental mass air flow (reference 250) and the open loop duty cycle command (reference 252). As illustrated by the above formula for the desired supplemental mass air flow, the function 250 varies in response to $(\phi_{EX}-1)\phi_{CATD}$ and the function 252 may optionally vary in inverse relation to a ratio of the estimated (or measured) barometric pressure and the estimated (or measured) exhaust pressure.

The catalyst equivalence ratio error and catalyst mass flow are also provided to function block 316, which determines an engine air fuel ratio override command as follows. An override engine equivalence ratio, $\phi_O$, is determined as follows:

$$\phi_O = (MAF_S + MAF_P) * \phi_{CATD}/MAF_P + \phi_E,$$

where $\phi_{CATD}$ the desired catalyst equivalence ratio (expected to start slightly lean of stoichiometry and to increase towards 1 as either engine run time or engine speed, or both, increase), and where $\phi_E$ is a closed loop correction term which keeps the short term average of the catalyst equivalence ratio as near to the target as possible. Block 316 then converts $\phi_O$ to an air/fuel ratio command through a standard conversion and outputs that command to block 318.

Block 318 limits the air fuel ratio override command based on the output of block 302 to prevent the engine from operating in a region where it is too rich and in danger of stalling or fouling the spark plugs. The output of block 318 is the signal on line 149 comprising the air fuel ratio override command.

If the secondary air flow is at the maximum capable by the system, block 317 determines a desired port mass air flow signal, $MAF_{PD}$, according to:

$$MAF_{PD} = MAF_S/((\phi_{EX}/\phi_{CATD}) - 1).,$$

Otherwise $MAF_{PD}$ is set according to a known optimal function relating port air flow to spark advance, engine speed and engine torque. Block 317 then determines the desired port mass airflow change command on line 178 as the difference between $MAF_{PD}$ and $MAF_P$.

Figure 5:
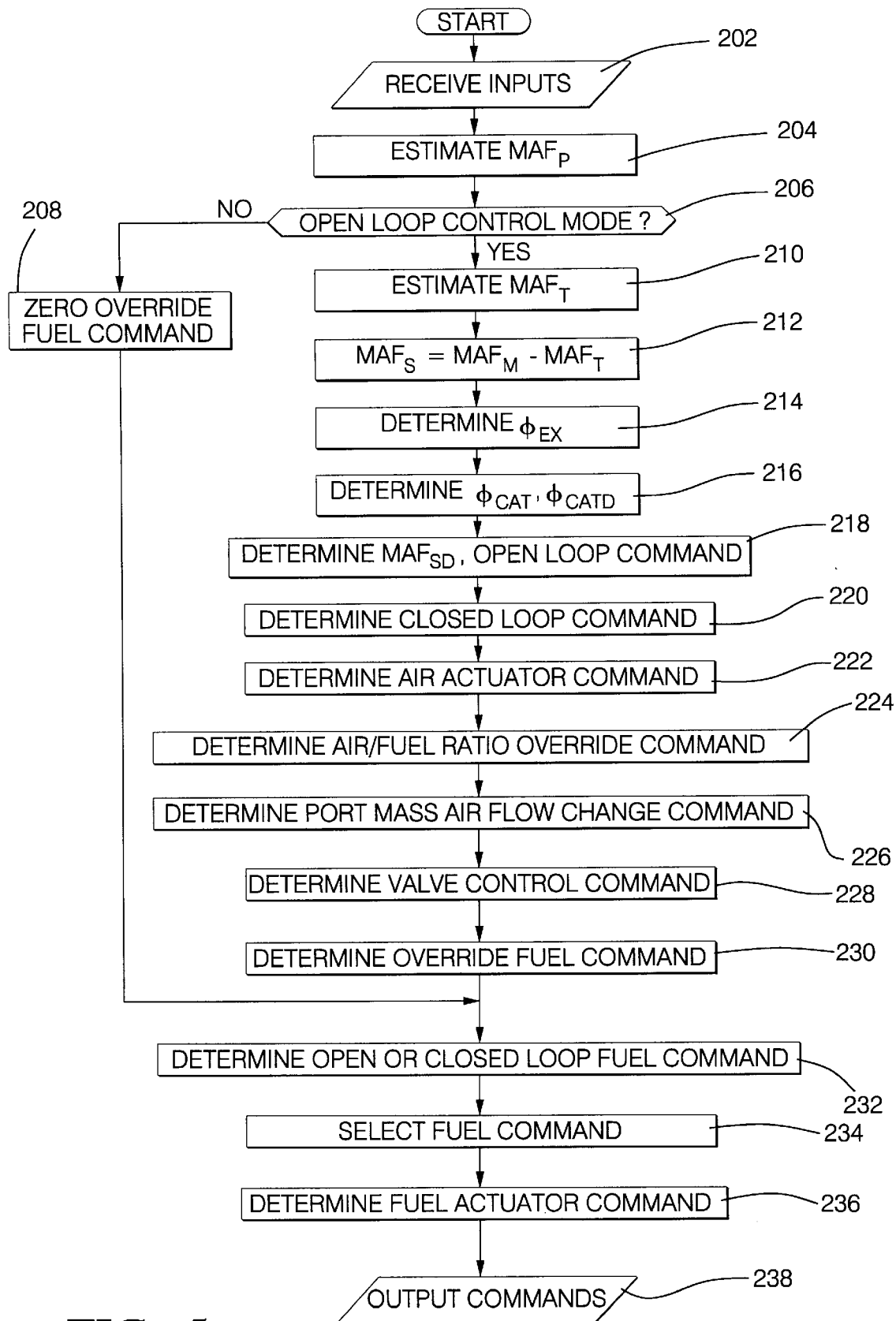
FIG. 5 illustrates a flow diagram of an example control routine according to this invention.

Referring now to FIG. 5, the example flow diagram begins at block 202 where the controller receives signal inputs from the various sensors shown in FIG. 1. Next, block 204 uses the input signals to estimate port mass air flow using the port air flow model-based estimator 156 referred to above with reference to FIG. 2. Then block 206 determines whether or not the vehicle is in open loop fuel control mode, as indicated by the engine controller using criteria for open and closed loop fuel control known to those skilled in the art. If the controller is in open loop control mode, the routine continues to block 210 where it estimates the mass air flow past the throttle as described above with reference to block 154 in FIG. 2. Block 212 then determines the secondary mass air flow as the difference between the mass air flow measured by the mass air flow sensor and that estimated at step 210.

Blocks 214 and 216 determine the exhaust equivalence ratio and the actual and desired catalyst equivalency ratios as described above with reference to blocks 302, 306 and 308 in FIG. 3. Blocks 218 determines the desired secondary mass air flow and the open loop actuator command for controlling secondary mass air flow as described above with reference to block 314 in FIG. 3. Block 220 determines the closed loop actuator command for controlling secondary mass air flow as described above with reference to block 162 in FIG. 2 and the secondary air actuator command is determined at block 222 as the sum of the commands determined at blocks 218 and 220.

Block 224 determines the air/fuel ratio override command as described above with reference to blocks 316 and 318 in FIG. 3. Block 226 determines the port mass air flow change command as described above with reference to block 317 in FIG. 3 and block 228 determines the valve control command responsive to the command determined at block 226. Block 230 determines the override fuel command responsive to the command determined at block 224 as described above with reference to block 168, FIG. 2.

Block 230 determines the open or closed loop fuel command in a conventional manner and block 234 selects either the override command or the command determined at block 232, whichever commands the most fuel. Block 236 determines the fuel actuator command in a known manner.

If at block 206 the system is not in open loop fuel control mode, block 208 sets the override fuel command to zero and then continues to block 232, described above.

Figure 6:
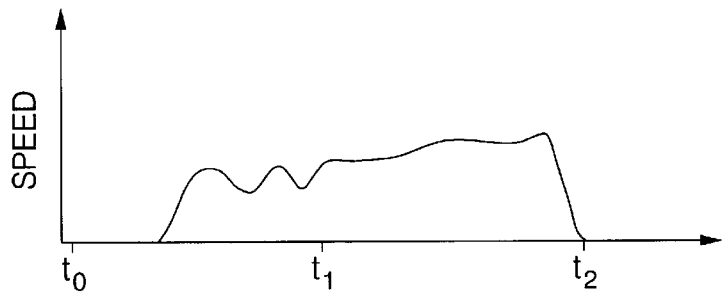
FIGS. 6, 7 and 8 illustrate, comparatively, advantages according to this invention.
Figure 7:
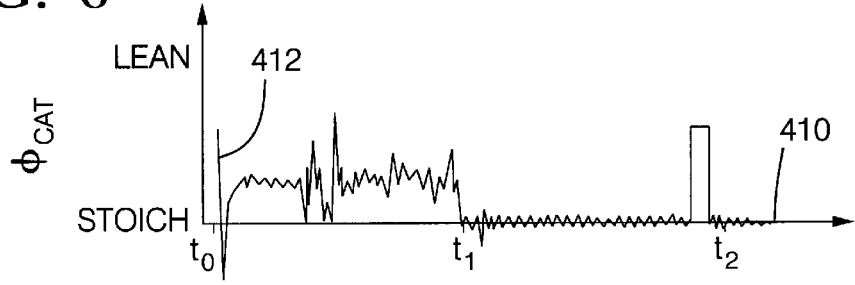
Figure 8:
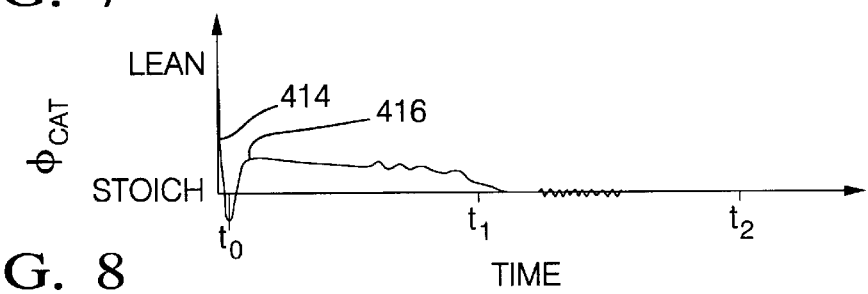

Referring now to FIGS. 6, 7 and 8, advantages of the present invention can be understood. FIG. 6 represents vehicle speed on a test vehicle where the engine is started at time $t_0$, idles for a few seconds and then begins moving to a speed of approximately 30 m.p.h. over a period of approximately two minutes. FIG. 7 illustrates the exhaust equivalence ratio, $\phi_{Ex}$, occurring in a vehicle with a secondary air pump without the closed loop control according to this invention. An exhaust equivalence ratio of 1 is represented by the central line 410. When the vehicle starts at time $t_0$, a rich spike occurs in the exhaust gas and then the exhaust moves to a lean operating range, which is achieved as the combination of the rich exhaust from the vehicle engine and the secondary air provided by the secondary air pump motor unit 72 (FIG. 1). At time $t_1$, the vehicle achieves closed loop fuel control, at which point the exhaust equivalence ratio is maintained substantially close to the line 410, indicating a $\phi_{Ex}$ of 1. Between times $t_0$ and $t_1$, spikes in both the rich and lean direction of $\phi_{EX}$ are indicated and occur due to the inaccuracies of open loop control provided to the secondary air pump.

Referring now to FIG. 8, a plot 414 is provided similar to plot 412 in FIG. 7. Plot 414 is represents $\phi_{EX}$ for a vehicle in which closed loop control of the secondary air, for example, as described above, is implemented. Between the times to and $t_1$, the spikes in $\phi_{Ex}$ are substantially reduced and $\phi_{EX}$ itself is gradually reduced during the open loop fuel control that takes place prior to time $t_1$. This illustrates both the improved response to the dynamic system provided by the vehicle control system described above and illustrates the ability to control the actual exhaust equivalence ratio to a desired profile, for example, peaking at reference 416 and gradually moving closer to the exhaust equivalence ratio of 1 at time $t_1$.

The example described above implies the use of a switching stoichiometric oxygen sensor. If an alternative sensor technology is used, the terms "open loop" and "closed loop" would be defined as non-stoichiometric and stoichiometric, respectively. It also implies that the system is mechanized to allow for modulation of the secondary air system. Any or all of secondary air, fuel or engine air control may modulate flow rate, equivalence ratio and chemistry of flow into the catalytic converter. The ability to control fuel is known to those skilled in the art along with some ability for the controller to control engine air. The level of engine air control and the need for modulation of the secondary air beyond on/off control will be determined based on the particular engine application and emission objective.

We claim:

1. An engine control system comprising:
    a mass air flow sensor (62) in an air intake path for a vehicle engine (44) and providing a first input signal indicative of mass air flow through the mass air flow sensor;
    an air pump unit (72) having an inlet (68) coupled between the mass air flow sensor and the vehicle engine and an outlet (76) coupled in a path of exhaust from the vehicle engine, wherein the air pump unit is controllable to pump secondary air from the inlet to the outlet;
    a first estimator (154) responsive to a set of measured engine parameters for providing a second input signal indicative of mass air flow into the intake manifold (40); and
    a first actuator, responsive to a first control command, controlling at least one function of a set of functions comprising: (a) fuel into the vehicle engine and (b) secondary air provided to the outlet of the air pump unit; and
    a control unit (12) including a first control command generator (152, 162) providing the first control command responsive to a difference between the first and second input signals, wherein improved control of chemistry and equivalence ratio of gases entering a catalytic converter (90) is achieved.

2. An engine control system according to claim 1, wherein the first estimator is included in the control unit.

3. An engine control system according to claim 1, wherein the first actuator comprises part of the air pump unit and controls secondary air provided to the outlet of the air pump unit, also comprising:
    a second actuator (176) for regulating fuel delivery to the engine responsive to a second control command;
    a second estimator (156) responsive to the set of measured engine parameters for providing a third input signal indicative of mass air flow through an intake port into the vehicle engine; and
    wherein the control unit includes a second control command generator (168) to provide the second control command responsive to the third input signal.

4. An engine control system according to claim 1,
    wherein the control unit also comprises an equivalence ratio estimator (306) for estimating an equivalence ratio of gases flowing into the catalytic converter,
    wherein the first control command generator (314) is also responsive to the estimated equivalence ratio.

5. An engine control system according to claim 3,
    wherein the control unit also comprises an equivalence ratio estimator (306) for estimating an equivalence ratio of gases flowing into the catalytic converter,
    wherein the second control command generator (314) is also responsive to the estimated equivalence ratio.

6. An engine control system according to claim 4, also comprising:
    a third control command generator (317), responsive to the estimated equivalence ratio, providing a third control command indicative of a desired change in engine mass air flow;
    an air flow valve actuator (181) responsive to the third control command to achieve the desired change in engine mass air flow, wherein closed loop control of engine mass air flow adjustments is achieved.

7. An engine control system according to claim 6, wherein the air flow valve actuator controls one member of a set comprising: an idle air control valve (28); and a throttle valve (32).

8. In a motor vehicle with a vehicle engine and a catalytic converter, an engine control method according to the steps of:
    using a mass air flow sensor, measuring mass air flow in an intake path for the vehicle engine (62);
    measuring a set of engine parameters (62, 38, 48);
    providing an air pump (72) in the vehicle, wherein the air pump has an air inlet located in an air intake path for the vehicle engine between the mass air flow sensor and the vehicle engine and an air outlet located in a path of exhaust gas from the vehicle engine;
    responsive to the set of engine parameters, estimating mass air flow into the intake manifold at a point downstream of the air inlet (154) to the air pump; and
    determining a difference between the measured mass air flow upstream of the air inlet and the estimated mass air flow downstream of the air inlet (158), wherein the difference represents secondary mass air flow through the air pump.

9. An engine control method according to claim 8, also comprising the step of:
    providing a first control command regulating air pumped through the air pump responsive to the difference (152, 162, 172), wherein closed loop control of secondary air provided by the air pump is achieved.

10. An engine control method according to claim 8, wherein the motor vehicle also includes an actuator for regulating fuel delivery to the vehicle engine, also comprising the steps of:
    responsive to the set of engine parameters, estimating mass air flow at an intake port of the vehicle engine (156); and
    providing a second control command regulating fuel delivered by the actuator to the engine responsive to the difference representing secondary mass air flow through the air pump and the estimated mass air flow at the intake port (168).

11. An engine control method according to claim 8, also comprising the steps of:
    responsive to the set of engine parameters, estimating mass air flow at an intake port of the vehicle engine (156);
    responsive to the estimated mass air flow at the intake port and the difference representing the secondary mass air flow through the air pump, estimating an equivalence ratio of gases flowing to the catalytic converter (306);
    wherein the first control command is also responsive to the estimated equivalence ratio.

12. An engine control method according to claim 10, also comprising the steps of:

responsive to the set of engine parameters, estimating mass air flow at an intake port of the vehicle engine (156);

responsive to the estimated mass air flow at the intake port and the difference representing the secondary mass air flow through the air pump, estimating an equivalence ratio of gases flowing to the catalytic converter (306);

wherein the second control command is also responsive to the estimated equivalence ratio.

13. An engine control method according to claim 8, also comprising the steps of:

responsive to the set of engine parameters, generating an open loop duty cycle command for secondary mass air flow through the pump;

responsive to the open loop duty cycle command and the difference representing secondary mass air flow through the pump, determining a closed loop correction to the open loop duty cycle command; and regulating air pumped through the air pump responsive to the open loop duty cycle command and the closed loop correction.

\* \* \* \* \*